United States Patent
Pignataro et al.

(10) Patent No.: US 10,476,743 B2
(45) Date of Patent: Nov. 12, 2019

(54) AUTOMATIC CREATION AND MANAGEMENT OF A COMMUNITY OF THINGS FOR INTERNET OF THINGS (IOT) APPLICATIONS

(71) Applicant: Cisco Technology, Inc., San Jose, CA (US)

(72) Inventors: Carlos M. Pignataro, Raleigh, NC (US); Mark Ammar Rayes, San Ramon, CA (US); Hazim Hashim Dahir, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 307 days.

(21) Appl. No.: 14/512,623

(22) Filed: Oct. 13, 2014

(65) Prior Publication Data
US 2016/0105305 A1    Apr. 14, 2016

(51) Int. Cl.
*H04L 29/08* (2006.01)
*H04L 12/24* (2006.01)
*H04W 4/70* (2018.01)
*H04W 4/40* (2018.01)
*H04W 4/04* (2009.01)

(52) U.S. Cl.
CPC ......... *H04L 41/0893* (2013.01); *H04W 4/046* (2013.01); *H04L 41/16* (2013.01); *H04W 4/40* (2018.02); *H04W 4/70* (2018.02)

(58) Field of Classification Search
USPC ....................................................... 709/223
See application file for complete search history.

(56) References Cited

U.S. PATENT DOCUMENTS

| | | | |
|---|---|---|---|
| 5,307,484 A * | 4/1994 | Baker | G06F 17/30312 |
| 7,010,600 B1 * | 3/2006 | Prasad | H04L 63/0815 |
| | | | 709/223 |
| 7,949,785 B2 * | 5/2011 | Alkhatib | G06Q 30/02 |
| | | | 709/245 |
| 8,229,791 B2 | 7/2012 | Bradley et al. | |

(Continued)

OTHER PUBLICATIONS

Fuhrer, "Building a Smart Hospital using RFID technologies," 1st European Conference on eHealth (ECEH06), Fribourg, Switzerland, Oct. 12-13, 2006, 14 pages.

(Continued)

*Primary Examiner* — Brian Whipple
*Assistant Examiner* — John Fan
(74) *Attorney, Agent, or Firm* — Edell, Shapiro & Finnan, LLC

(57) ABSTRACT

Presented herein are techniques for automatically creating communities of network-connected devices, i.e., Internet of Thing (IoT) devices. One or more of a plurality of network-connected devices are identified based on one or more policies that define one or more communities of network-connected devices. A community of network-connected devices includes network-connected devices that share common functional, physical or relational attributes. Information is stored that indicates the one or more communities of which each of the one or more of the plurality of network-connected devices is a member based on the policies that define the one or more communities and functional, physical or relational attributes of the one or more of the plurality of network-connected devices.

18 Claims, 13 Drawing Sheets

(56) References Cited

U.S. PATENT DOCUMENTS

| | | | |
|---|---|---|---|
| 8,274,383 B2 | 9/2012 | Mitchell et al. | |
| 8,437,904 B2 | 5/2013 | Mansouri et al. | |
| 8,640,036 B2 | 1/2014 | Pignataro et al. | |
| 8,806,010 B2 | 8/2014 | Vance | |
| 9,100,444 B2 * | 8/2015 | D'Amore | H04L 67/22 |
| 2002/0143960 A1 * | 10/2002 | Goren | H04L 12/4641 |
| | | | 709/229 |
| 2003/0151513 A1 * | 8/2003 | Herrmann | G08B 25/003 |
| | | | 340/573.1 |
| 2007/0234351 A1 * | 10/2007 | Iyoda | G06F 8/60 |
| | | | 717/174 |
| 2013/0212598 A1 * | 8/2013 | Doitch | G06F 9/44521 |
| | | | 719/318 |
| 2013/0318589 A1 * | 11/2013 | Ford | H04L 63/08 |
| | | | 726/7 |
| 2014/0222725 A1 | 8/2014 | Vasseur et al. | |
| 2014/0222729 A1 | 8/2014 | Dasgupta et al. | |
| 2014/0222730 A1 | 8/2014 | Vasseur et al. | |
| 2014/0281508 A1 * | 9/2014 | Akhter | H04L 9/0833 |
| | | | 713/162 |

OTHER PUBLICATIONS

Emery, "Distributed Eventing Architecture: RFID and Sensors in a Supply Chain," retrieved from http://db.lcs.mit.edu/madden/html/theses/emery.pdf, on Oct. 7, 2014, 60 pages.

* cited by examiner

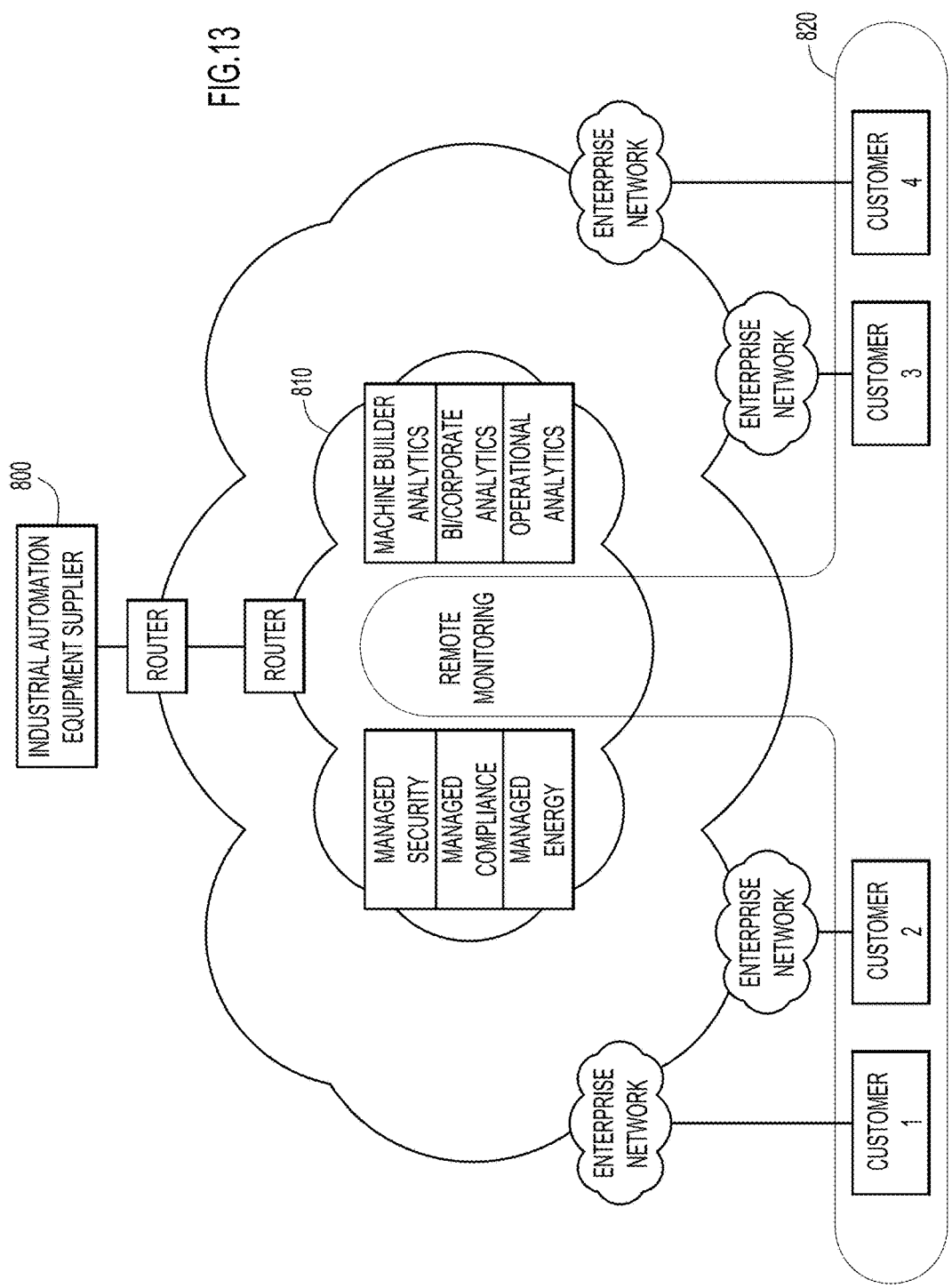

AUTOMATIC CREATION AND MANAGEMENT OF A COMMUNITY OF THINGS FOR INTERNET OF THINGS (IOT) APPLICATIONS

TECHNICAL FIELD

The present disclosure relates to Internet of Things (IoT) and Internet of Everything (IoE) applications.

BACKGROUND

In the Internet of Everything (IoE), billions of things (and people) will be connected. The need to individually address and communicate with a particular network-connected device has some utility. Examples of such network-connected devices include sensors, actuators, etc., also referred to as Internet of Thing (IoT) devices.

BRIEF DESCRIPTION OF THE DRAWINGS

FIG. 13 is a system diagram illustrating a second use case of the federation of at least two communities of network-connected devices, according to an example embodiment.

DESCRIPTION OF EXAMPLE EMBODIMENTS

Overview

Figure 1:
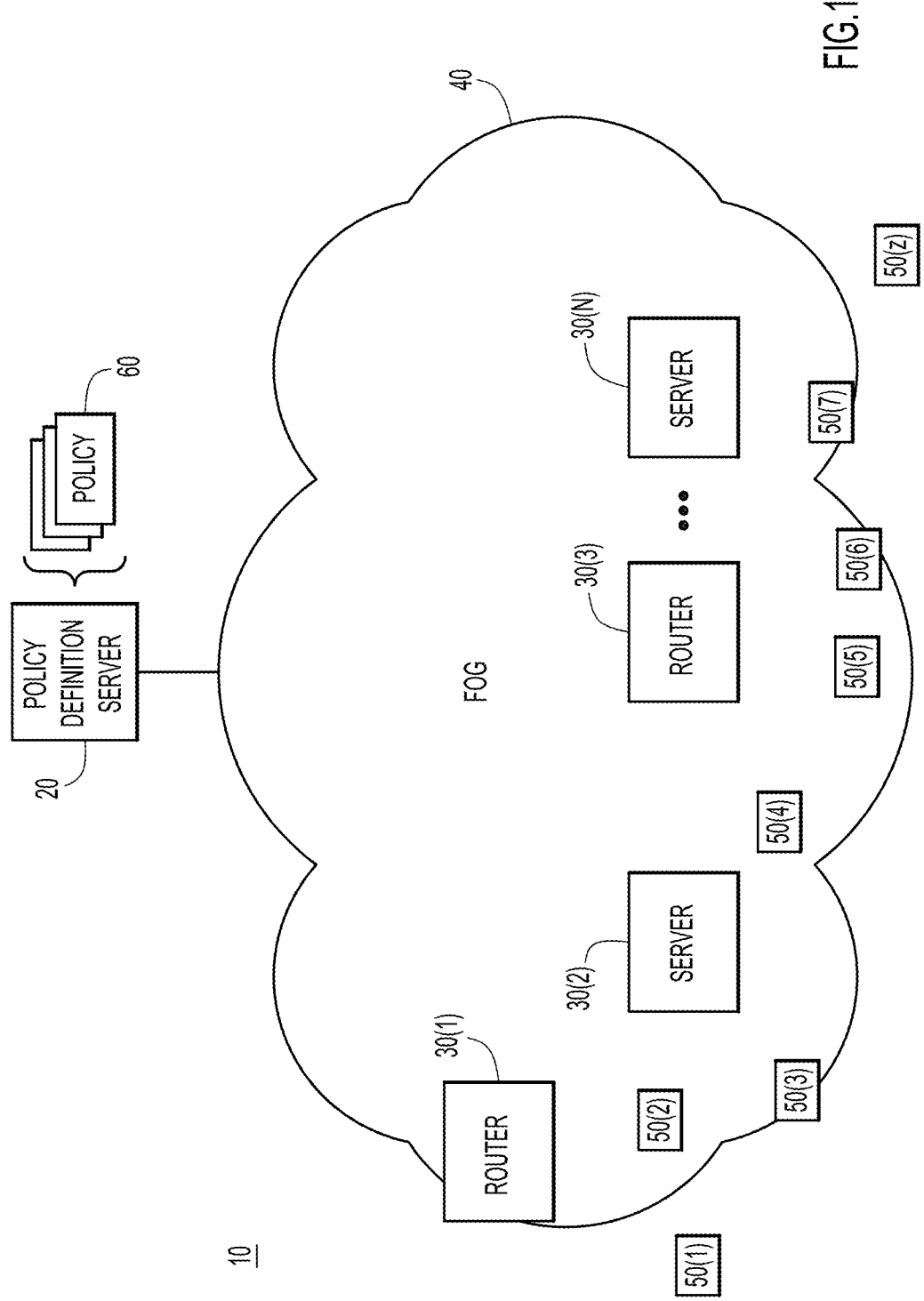
FIG. 1 is a block diagram of a system including a policy server and a plurality of edge network devices, according to an example embodiment.

In one embodiment, a method is provided that involves identifying one or more of a plurality of network-connected devices based on one or more policies that define one or more communities of network-connected devices. A community of network-connected devices includes network-connected devices that share common functional, physical or relational attributes. Information is stored that indicates the one or more communities of which each of the one or more of the plurality of network-connected devices is a member based on the policies that define the one or more communities and functional, physical or relational attributes of the one or more of the plurality of network-connected devices.

Example Embodiments

As the world becomes more connected by the Internet, a tremendous amount of information is being collected by thousands of sensors. Most of this information, however, is not being utilized by businesses and applications due to the lack of an infrastructure to extract such intelligence and then direct the intelligence to the entity that can use it.

However, often the case will be that it is more interesting and useful to be able to communicate with a plurality of network-connected devices. A subset of such network-connected devices may be referred to as a "community." A community can be broadly defined by a certain "affinity" or a common set of parameters among all the member things. For example, all oil rig sensors that measure pressures above a certain threshold in a given time period can be considered a community.

A challenge is creating and subsequently managing a community. Communities can be created manually. Techniques are presented herein to automatically and dynamically create communities, with as little human intervention as possible, especially when members of the community are heterogeneous.

The following are examples of a community of network-connected devices, also referred to herein as Internet of Thing (IoT) devices. These examples are not meant to be limiting.

Example 1 The things are sensors on trucks that belong to a fleet. The community is trucks/drivers that speed excessively (e.g., a predetermined amount over the posted limit). The community may be of interest to the fleet owner.

Example 2 The things are cars with speed sensors. The community is cars that never exceed the speed limits. The community may be of interest to an insurance company that rewards responsible drivers.

Example 3 The things are medical related sensors, for example in a hospital. The community is patients with a common measured characteristic. The community may be of interest to pharmaceutical companies.

In the examples above, the members of the community were "homogeneous". In the next examples, they are not.

Example 4 The things are ambulances in a particular city or town and sensors on traffic lights in the city. The community is the union of the two.

Example 5 The things are sensors on taxis in a particular city or town and entertainment events on a given night. The community is the union of the two.

Example 6 A person can be considered a "thing" represented by a unique identifier in a government or other database, an identifier in a social networking database or a device attached to, carried by or otherwise associated with a person.

The dynamic nature of community creation may be necessitated by the fact that even though the things are participating in the IoE, community creation may be of interest due to a triggering event that does not allow (pre)-configuration. For example, an ambulance with a patient in very critical condition may require intervention in the traffic lights through a city. Which lights should be intervened will depend on dynamic factors like position of the ambulance, time of day, etc. The automatic creation of a community is desirable in general, and especially in situations where the creation of the community is mandated by alarm triggers.

Presented herein are a system and methods to use (software) agents at computing nodes (or in the cloud where global analysis is performed), IoE sensors (via IoE getaways), routers and servers to dynamically create and manage communities of things for IoT/IoE applications. The agents can monitor traffic that identifies a thing and send relevant information about it to a database that will maintain data about each community.

Reference is now made to FIG. 1. FIG. 1 illustrates a system 10 that includes a policy definition server 20, a plurality of devices 30(1)-30(N) on the edge of a network. The edge devices 30(1)-30(N) are also referred to herein as "fog" devices since they are configured to operate on the very edge of a network/cloud 40 and have first-hop network connectivity to a plurality of network-connected devices 50(1)-50(z). The network-connected devices 50(1)-50(z) are also referred to herein IoT devices, and may include sensors, actuators, smartphones, or any other device with network connectivity and which performs a sensing, actuating or other function. As explained further hereinafter, the policy definition server 20 (referred to simply as a server) generates policies, shown collectively at reference numeral 60. The policies 60 are used to automatically create communities of network-connected devices. Again, a community of network-connected devices is a subset of network-connected devices that share common functional, physical or relational attributes, as well as policy-defined attributes.

Figure 2:
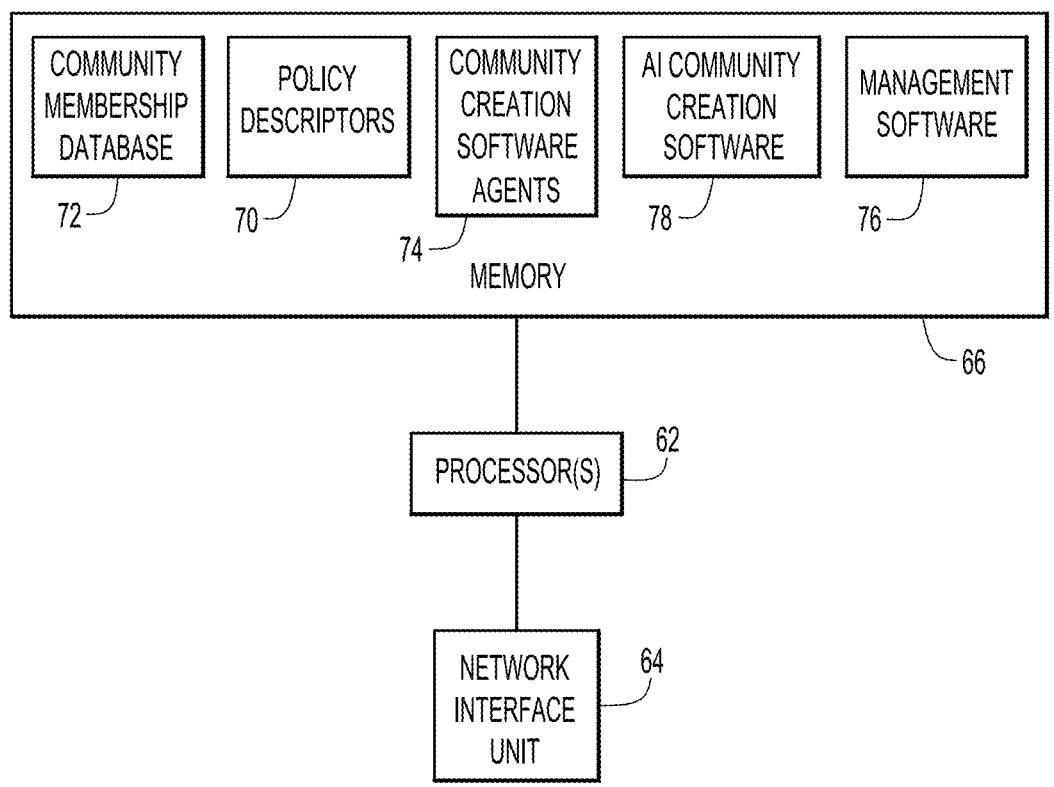
FIG. 2 is a block diagram of the policy server, according to an example embodiment.

Reference is now made to FIG. 2. FIG. 2 illustrates an example block diagram of the server 20. The server 20 includes one or processors 62, a network interface unit 64 to enable network communication with the fog devices 30(1)-30(N), and memory 66. The memory stores data used in connection with the server operations, and software that is executed by the processor 62. In one example embodiment, the processor 62 is a microcontroller or microprocessor. To this end, the memory stores data for policy descriptors 70. The policy descriptors 70 define the one or more communities of IoT devices. There is a community membership database 72 that stores the identities of network-connected devices that are in each community, as well as any relationships between network-connected devices. Prior to assignment to a community, the community membership database 72 stores information representing identities and attributes of network-connected devices that are connected to the fog devices 30(1)-30(N).

The memory 66 may comprise read only memory (ROM), random access memory (RAM), magnetic disk storage media devices, optical storage media devices, flash memory devices, electrical, optical, or other physical/tangible memory storage devices. The processor 62 executes instructions stored in memory 66. Thus, in general, the memory 66 may comprise one or more tangible (non-transitory) computer readable storage media (e.g., a memory device) encoded with software comprising computer executable instructions and when the software is executed (by the processor 62) it is operable to perform the operations described herein for the server 20.

Depending on how the communities are automatically created, the server may include community creation software agents 74 that inspect the database 72 and form each community. There is management software 76 to inspect the database and manage the community. Examples of management functions include adding and deleting members for a community, changing the policy that defines the group/community, and dissolving an existing community when the common parameters (among all the member IoT devices) no longer exist.

In another form, the server 20 utilizes data (e.g., IoT sensor data) collected by the fog devices 30(1)-30(N) and Artificial Intelligence (AI) through the execution of the AI community creation software 78. The AI community creation software 78 analyzes information representing identities and attributes of the plurality of network-connected devices to create the one or more communities, and then groups results into categories that can be utilized by communities. For example, the server 20 collects information about how devices are utilized (e.g. medical scanning systems, home appliances, etc.) to deliver a service. Feedback information may be categorized by market segments but generally includes common sets of specific information such as feature usage patterns (feature A is used with feature B), features used the most, features used the least and features never used. In other words, as much information as possible is collected about the IoT devices. This information is structured using AI techniques, and the resulting information describing the one or more communities is stored and made available to the appropriate fog devices. The results of the AI analysis are grouped into categories for use in assigning network-connected devices It should be understood that the server 20 may be implemented by one or more applications running in a cloud or data center computing environment. Moreover, the functions of the server 20 may be performed by one of the fog devices 30(1)-30(N).

Figure 3:
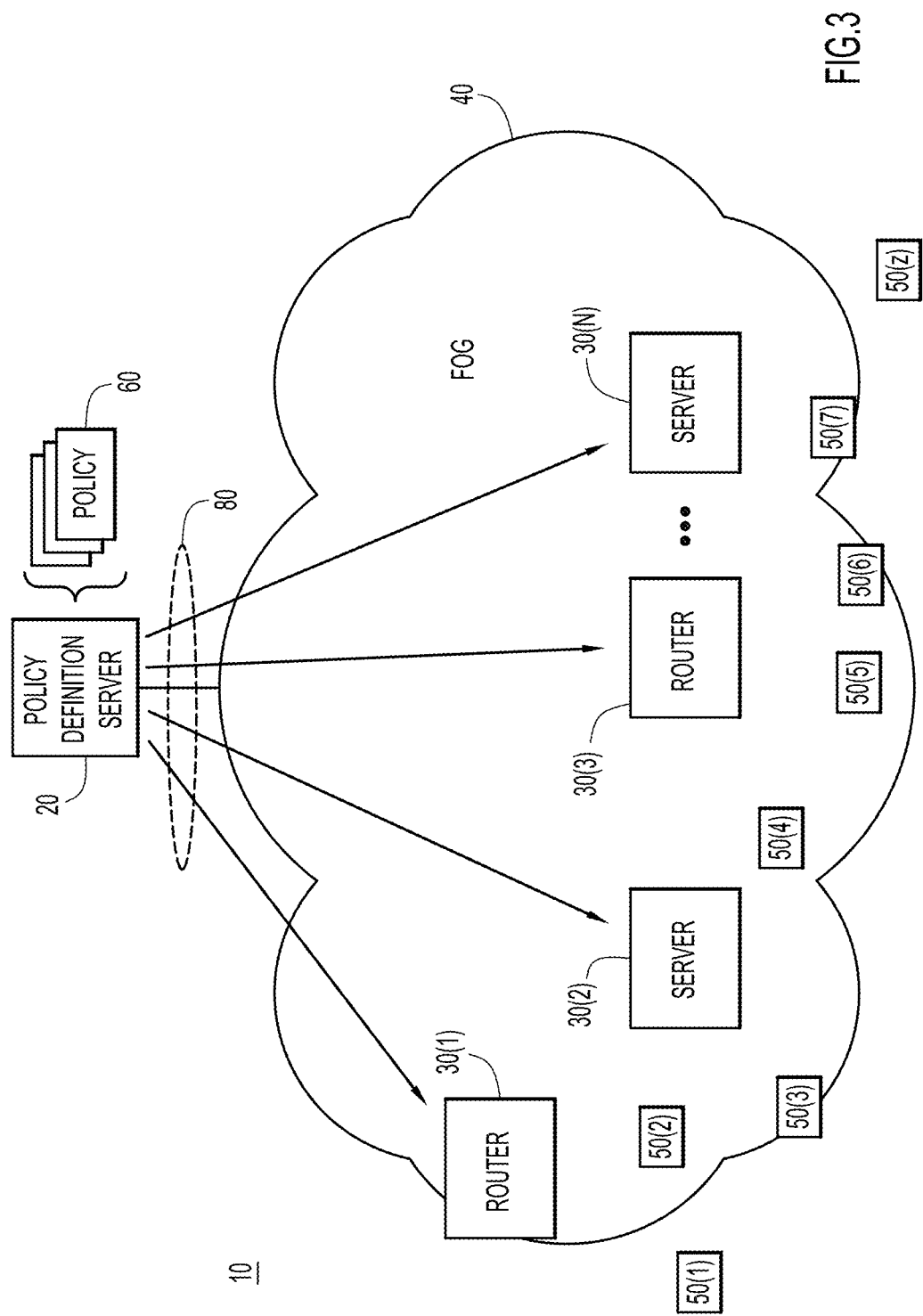
FIGS. 3-5 are diagrams similar to FIG. 1, but illustrating steps in a process for forming communities of network-connected devices, according to an example embodiment.
Figure 4:
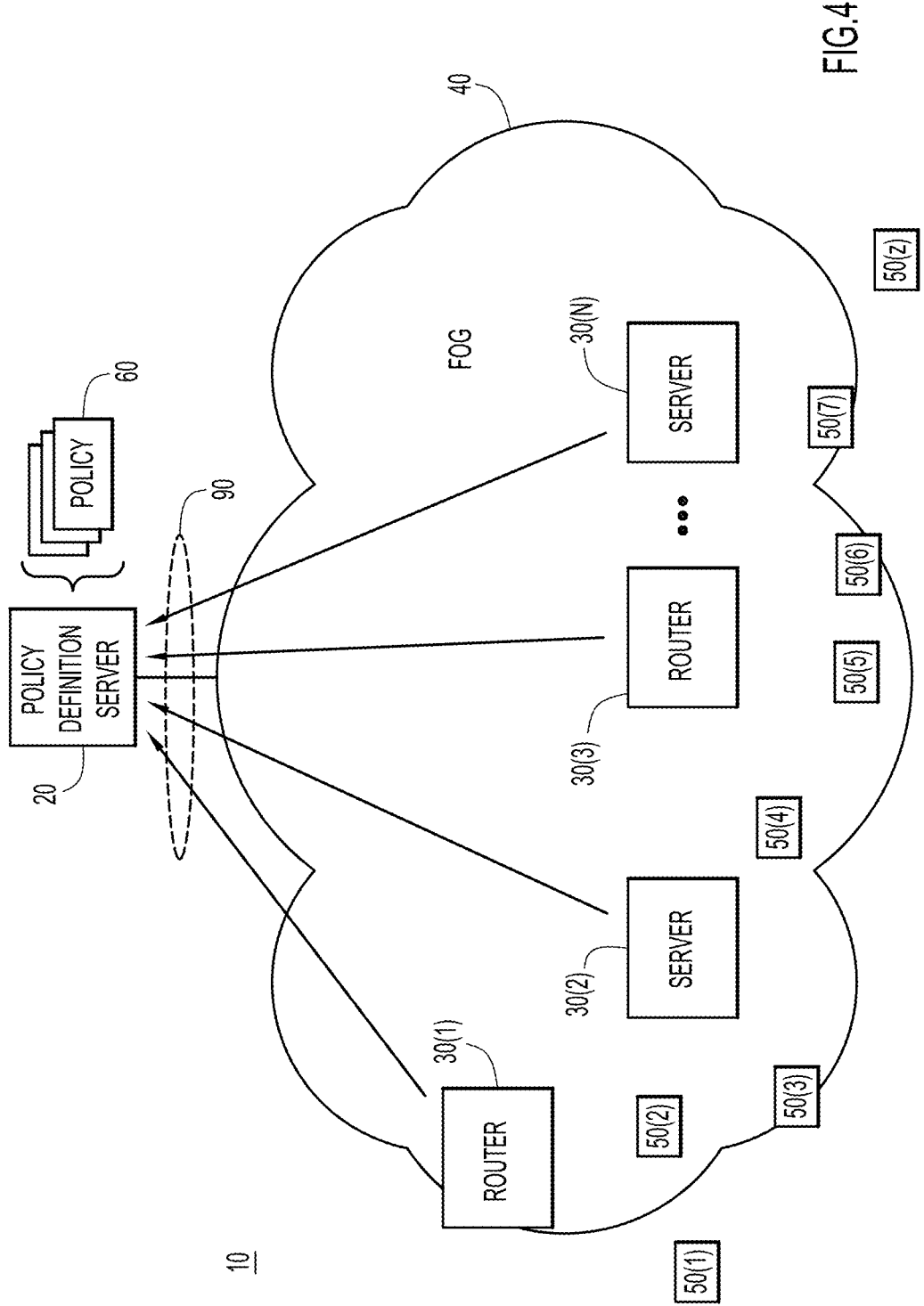
Figure 5:
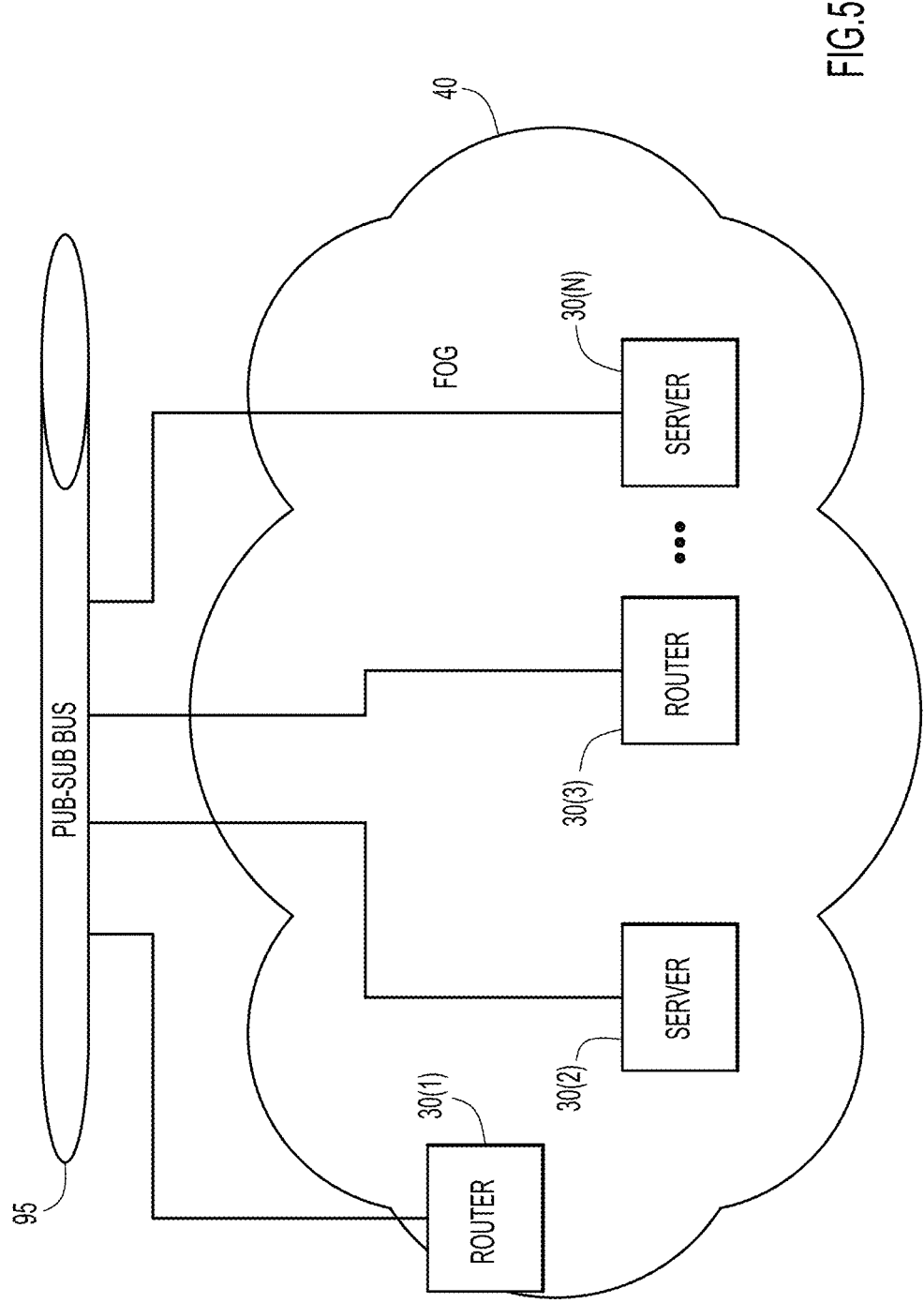

Reference is now made to FIGS. 3-5. These figures generally illustrate the flow for the creation of policies and the pushing of the policies to the fog devices. The creation software (either the community creation software agents 74 or the AI community creation software 78) inspects the database and creates a modeled policy. In one embodiment, the policy utilizes standard policy language definitions. At this point, a community is defined by way of the policy. As shown at reference numeral 80 in FIG. 3, this policy is then pushed down to fog devices, and the fog devices are thereby instructed to identify community members and then inform the server 20.

The policy contains policy elements, which are functional abstractions. These abstractions may be represented in a policy language that is pushed down to fog devices via Extensible Markup Language (XML), JavaScript Object Notation (JSON), or other structured syntax. The policy-set contains a tree of policy elements. Importantly, the policy elements also contain policy triggers.

Each network-connected device being discovered contains an identity. Again, this identity (<THING_IDENTIFIER>) can be an XMPP (or Jabber) identifier (ID) uniquely created, or other ID. Policies can be updated, kept-alive, or deleted.

The actual creation of the "community" may be modeled via an information model. For example:

```
<ioe-community> ::= (<community>...)
<community> ::= <COMMUNITY_IDENTIFIER>
    (<thing>
    (<relationship>...)
    [<community-type>]
    [<aggregated-community>]
    [<community-extension>]
<community-type> ::= (type 1 | type2 | ...)
<aggregated-community> ::= <COMMUNITY_IDENTIFIER>
<thing> ::= <THING_IDENTIFIER>
<relationship> ::= <REL_IDENTIFIER>
    <source>
    <destination>
```

As shown in FIG. 4, the fog devices send join requests on behalf of IoT devices, as shown at reference numeral 90, to the server 20. Specifically, each fog device generates a join message on behalf of the one or more of the plurality of network-connected device, where the join message identifies a particular network-connected device and the community to which the network-connected device joins. The join message is sent by each network-connected device to the server 20.

Thus, to summarize FIGS. 2-4, the process is one in which the creation software inspects the database of network-connected devices and creates a modeled policy. At this point one or more communities are defined by way of the policy. This policy is then pushed down to fog devices (routers and servers at the fog layer), and the fog devices are thereby instructed to identify community members and then inform the server or another fog device operating as the central hub or controller.

The management of the community of things follows a different mechanism. As IoT devices are added to the community, those devices (also by way of policy) join a shared bus, over which management is performed via a publish-subscribe (pub-sub) model on the bus. FIG. 5 generally depicts pub-sub management bus 95. The pub-sub management bus 95 is a common bus on which members can publish and members can subscribe to specific data being published. Publish-subscribe is a messaging pattern where senders of messages, called publishers, do not program the messages to be sent directly to specific receivers, called subscribers. Instead, published messages are characterized into classes, without knowledge of what, if any, subscribers there may be. Similarly, subscribers express interest in one or more classes, and only receive messages that are of interest, without knowledge of what, if any, publishers there are.

As explained above, in some cases, human intervention is required in defining criteria for what constitutes a community. In others, given a set of attributes, the criteria can be programmatically defined. In either case, the criteria are automatically pushed to fog devices. No human intervention is required from that point on. Alternatively, if the IoT devices are configured with sufficient intelligence, they can send identifying messages towards the community membership database 72. The above creation method is dynamic. IoT devices that are discovered can belong to the community.

Figure 6:
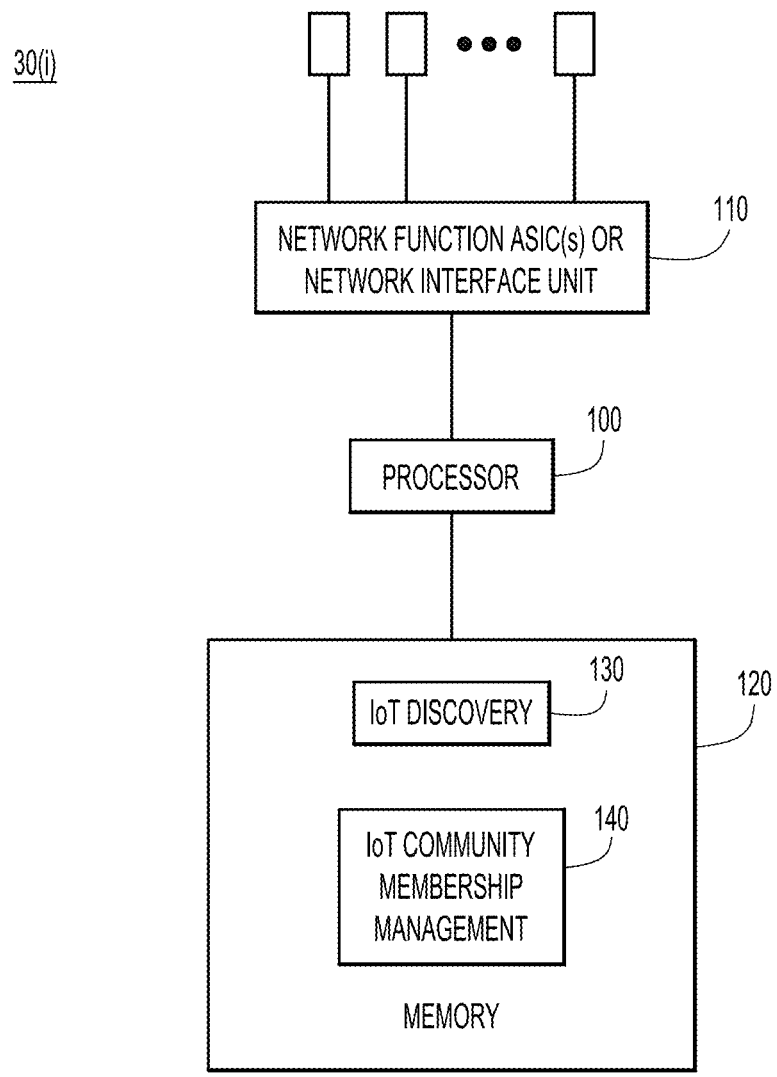
FIG. 6 is a block diagram of an edge network device, according to an example embodiment.

Turning now to FIG. 6, a block diagram is shown of a fog device, identified generally at reference numeral 30(*i*). The fog device 30(*i*) includes a processor 100, a network function application specific integrated circuit (ASIC) or a network interface unit 110 and memory 120. The fog device 30(*i*) may include a network function ASIC if it is a network router or switch device, or it may include a network interface unit (e.g., network interface card) if it is a server or other computing node. In some examples, the fog device 30(*i*) may include both a network function ASIC and a network interface unit. The processor 100 may be a microprocessor or microcontroller. The memory 120 stores software that includes instructions that are executable by the processor 100. For example, the memory 120 stores software instructions for IoT discovery module 130 and for IoT community membership management module 140.

The IoT discovery module 130 operates to discover IoT devices that are connected to the fog device, and to store information about each discovered IoT device. The IoT community management module 140 operates to manage the community membership of IoT devices connected to the fog device 30(*i*).

Figure 7:
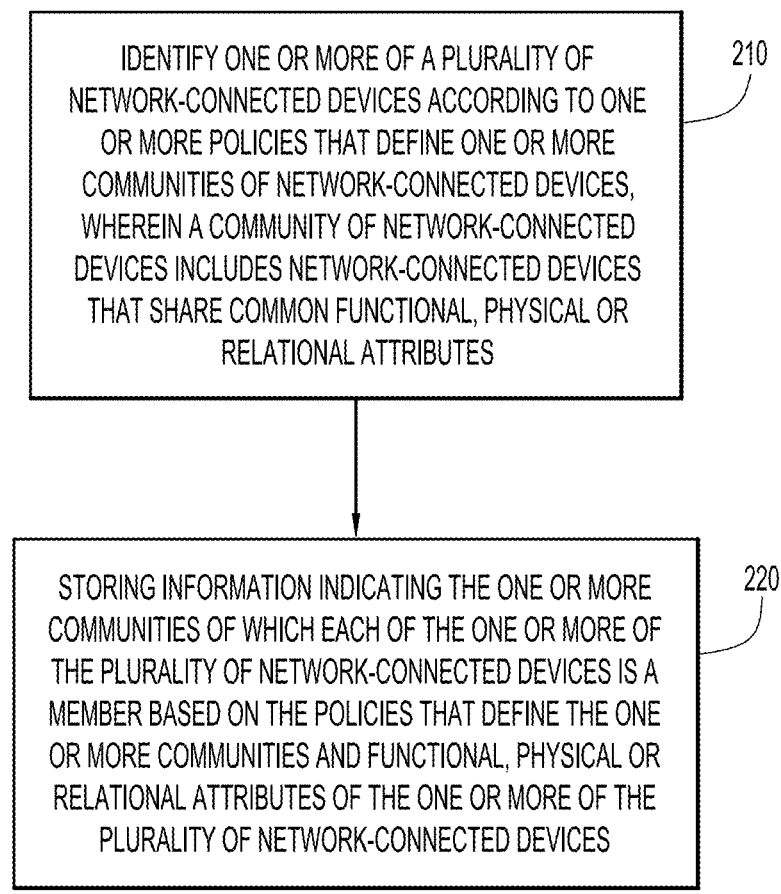
FIG. 7 is a flow chart of a method performed at an edge network device, according to an example embodiment.

Reference is now made to FIG. 7. FIG. 7 illustrates a flow chart for a method 200 performed at fog devices 30(1)-30(N), according to an example embodiment. At 210, one or more of a plurality of network-connected devices are identified according to one or more policies that define one or more communities of network-connected devices. As explained herein, a community of network-connected devices includes network-connected devices that share common functional, physical or relational attributes. At 220, information is stored that indicates the one or more communities of which each of the one or more of the plurality of network-connected devices is a member based on the policies that define the one or more communities and functional, physical or relational attributes of the one or more of the plurality of network-connected devices.

Figure 8:
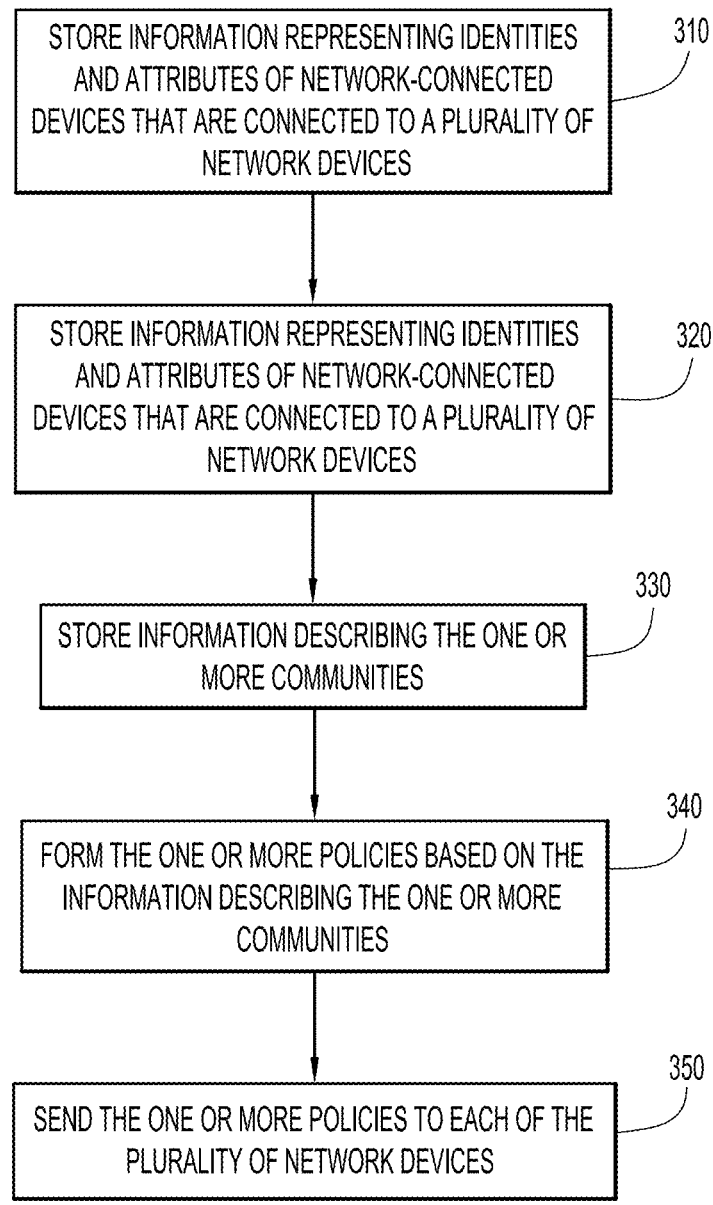
FIG. 8 is a flow chart of a method for the automatic creation of communities, according to an example embodiment.

Turning to FIG. 8, a flow chart is shown for a method 300 for automatically creating communities of IoT devices, according to an example embodiment. This method is performed by the server 20 or by any of the fog devices 30(1)-30(N) that is configured to perform these operations. At 310, information is stored that represents identities and attributes of network-connected devices that are connected to a plurality of devices operating on the network edge (i.e., fog devices). The network-connected devices need not be identifiable by a single identifier. At 320, the information representing identities and attributes of the plurality of network-connected devices is analyzed to create one or more communities of network-connected devices based on functional, physical or relational attributes. It is noted that the attributes that define a particular community can change at any time. At 330, information is stored describing the one or more communities created at 320. At 340, one or more policies are formed based on the information describing the one or more communities. At 350, data representing the one or more policies are sent to each of the plurality of devices operating on the network edge.

Figure 9:
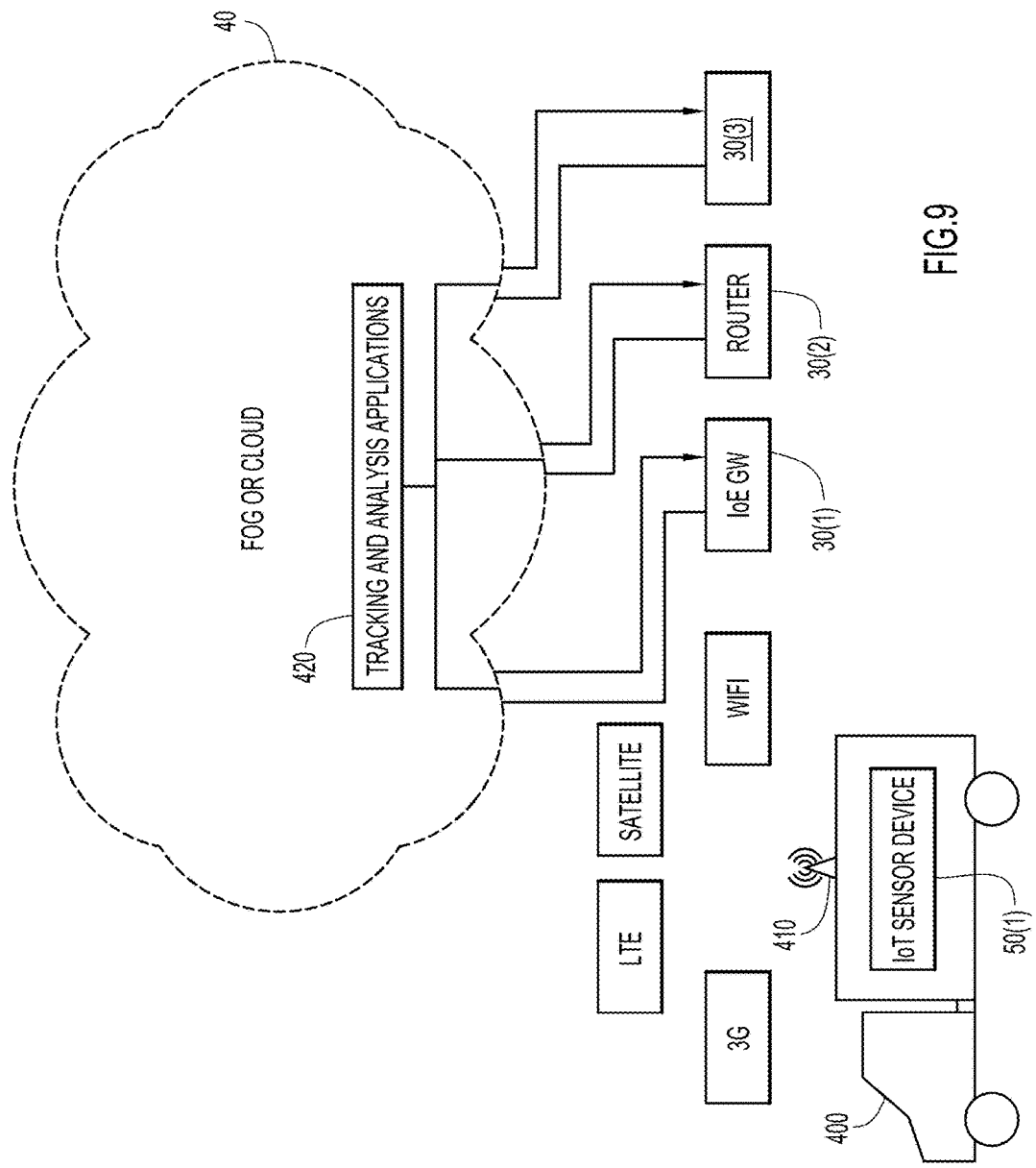
FIG. 9 is a system diagram illustrating a delivery vehicle tracking use case for a community of network-connected devices, according to an example embodiment.

Reference is now made to FIG. 9. FIG. 9 illustrates an example use case for a fleet of delivery vehicles. In this example, a vehicle is shown at 400. The vehicle includes one or more IoT sensor devices, generally identified at reference numeral 50(1). The vehicle further includes a wireless transceiver device 410 capable of transmitting by way of one or more wireless local or wide area networks (e.g., 3G, Long Term Evolution (LTE), Wi-Fi® or satellite). In this example, there are fog devices including an IoE wireless gateway (GW) 30(1), a router 30(2) and a server 30(3) through which data from the IoT sensor device 50(1) is directed. This data is then directed to one or more tracking and analysis applications 420 running in the fog/cloud 40.

As an example, the IoT sensor device 50(1) in the vehicle 400 includes the ability to track package location, temperature and pressure. Additional sensors on the vehicle 400 may also detect vehicle speed to detect over-speeding (e.g., based on location and speed limits from well-databases of speed limits) and then send a notification to the appropriate community indicating speeding violations of certain vehicles. A certain percentage of top speeding vehicles/drivers (e.g., 10%) are tracked in a community and the data is shared with the drivers and their supervisors/managers. In addition, embedded management sensors track configuration changes in all devices of a specific type (e.g., product identifiers (PIDs)) when a new service or image upgrade is introduced. Exceptional/outlier configuration changes (e.g., all devices of a particular type were configured the same way except three devices) are shared with network administrator (e.g., the associated community).

In accordance with a further aspect, a method is provided for sensor/actuator registration with details for expected payload formats. A diverse set of IoT sensors/actuators with diverse protocols and capabilities can register to indicate their capabilities and expected communication formats. Once that happens, a "fog policy" can be distributed to the registered IoT sensors/actuators, such that they act on that policy. In one example, the IoT sensors/actuators can act on data-in-motion capabilities by analyzing specific types of data as specified in the policy. In so doing, an administrator can be provided with cross-vendor control of devices in a community of IoT devices. Thus, to summarize this feature, a plurality of network-connected sensor and actuator devices having diverse capabilities are registered at a fog device. These network-connected sensor and actuator devices may communicate with different communication protocols. The fog device distributes to the plurality of network-connected sensor and actuator devices information for a policy that describes analysis to be performed on specified types of data obtained by the plurality of network-connected sensor and actuator devices.

Figure 10:
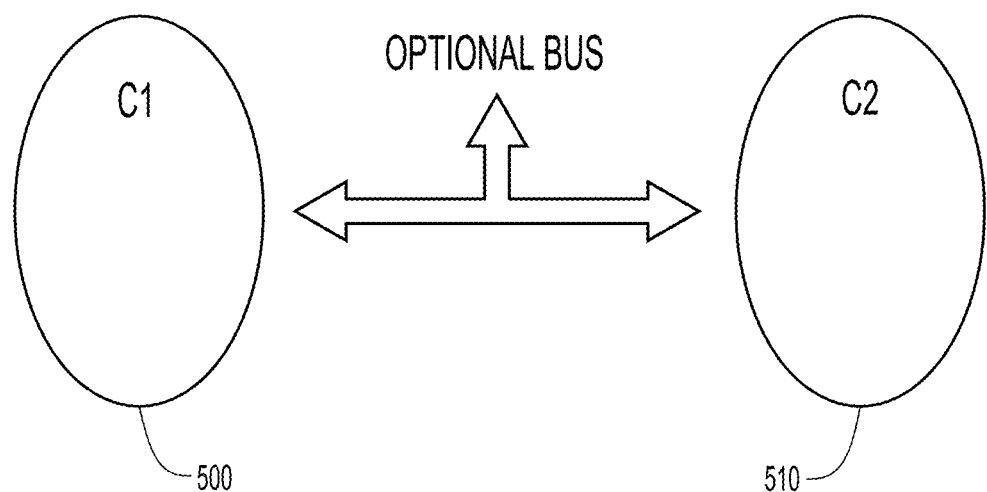
FIG. 10 is a diagram illustrating a federation of at least two communities of network-connected devices, according to an example embodiment.

In accordance with a further aspect, techniques are presented herein to automatically form a connection/conversation between disparate IoT communities. Reference is now made to FIG. 10. FIG. 10 shows two IoT communities, C1 shown at reference numeral 500 and community C2 shown at reference numeral 510, which have already been created. For example, community C1 is the community of cars with speed sensors, and community C2 includes insurance companies that decide to reward good driving behavior. A "federation" among two (or more) communities can be used to provide a service to the members of at least one community. Further examples in the form of use-cases are described below In the IoT space, the routers in an autonomous network can be thought of as community C1. The network managers can be thought of as community C2. A service could involve sending text messages to all managers on duty when a router fails. The federation methodology in this example involves: (a) specific policy rules for associating/disassociating the two (disparate) communities of things; (b) a list of what services are to be provided; and (c) authentication rules for the exchange of messages between the two communities. Specific protocols are used in this example to enable the service. Protocols are needed, for example, to realize the discovery of the set of network managers on duty, and to send group-messages to the set of network managers on duty.

A paradigm for IoT community federation presented herein is as follows. The two (or more) communities discover the existence of each other (via push/pull methods, Hello-like messages, etc.). The communities establish the conversation rules (agree on grammar, syntax of messages, security, and generic policy). The communities establish management rules (e.g., when to dissolve the federation). Different protocols can be used for realizing the federation, such as OpFlex (a technology developed by Cisco Systems, Inc.), Extensible Messaging and Presence Protocol (XMPP), and Border Gateway Protocol (BGP).

Figure 11:
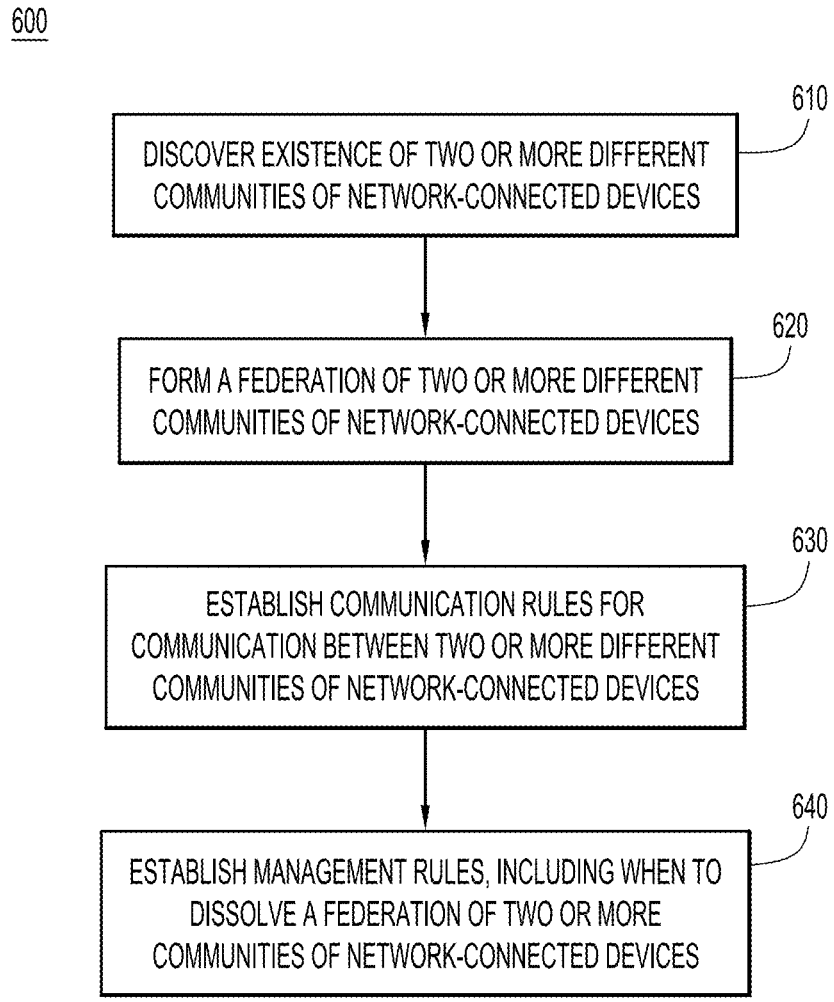
FIG. 11 is a flow chart of a method for forming a federation of at least two communities of network-connected devices, according to an example embodiment.

Turning now to FIG. 11, a flow chart is now described for a method 600 for forming a federation of two or more communities of IoT devices. At 610, the existence of two or more different communities of network-connected devices is discovered. For example, similar to how IoT members of a community are discovered, a policy may be set and communities of IoT devices check the attributes of the policy to discover other communities. As a further example, communities with common functional, physical or relational attributes may form a federation. At 620, a federation of two or more different communities of network-connected devices is formed. At 630, communication rules are established for communication between two or more different communities of network-connected devices. At 640, management rules for the federation are established, including when to dissolve a federation of two or more communities of network-connected devices.

Federation of Community Use Cases

Use Case: Providing Cost-Effective Blood Supply Services in the Healthcare IoE

In this use case, the goal is to minimize the chances a hospital runs out of its blood supply. With the assumption of proper analytics in play, this can be cast as minimizing the financial cost of keeping blood supplies at safe levels.

Suppose that IoT sensors in blood supply packages (and software agents in blood supply stores) provide information about the blood supply (type, quantity, etc.) This information can be used to automatically form a first community C1, the community of blood supply. Suppose that C2 is another community in which the members are patients that need blood. Suppose further that a third community C3 is the community of blood donors.

The communities can be hierarchical in structure, with levels organized per county, state, region, etc. Federating communities C1 and C2 can be used to cost effectively match blood supplies to the patients. Federating communities C1 and C3 can be used to start (local) blood supply campaigns when supply levels fall below thresholds. The triggering events for community interactions can be the subject of analytics software.

Use Case: Providing Optimized Sensor/Analytic Services in Oil and Gas IoE

Figure 12:
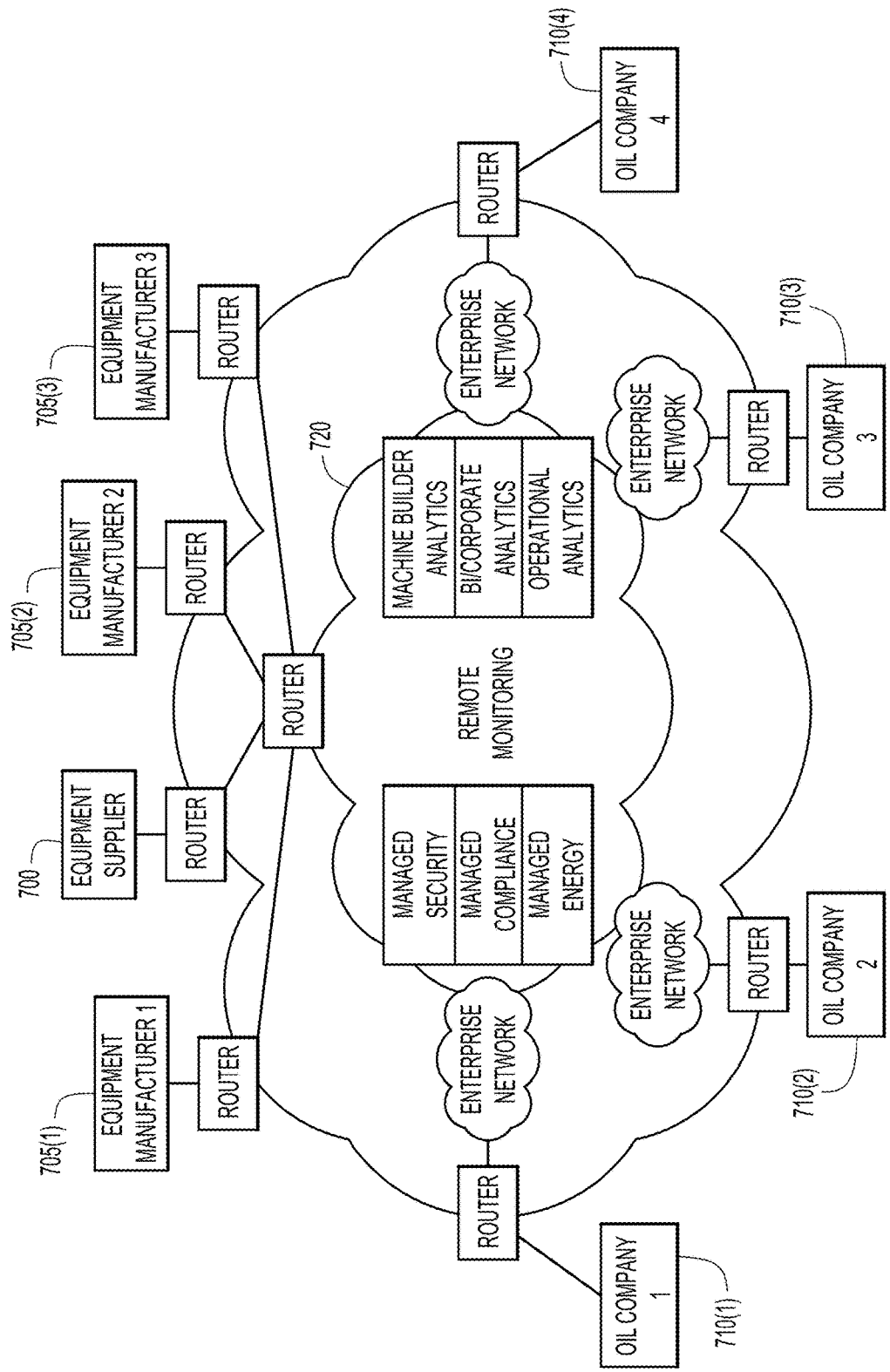
FIG. 12 is a system diagram illustrating a first use case of the federation of at least two communities of network-connected devices, according to an example embodiment.

Reference is made to FIG. 12. In this use case, the goal is to minimize the cost of supplying services in the Oil and Gas IoE while at the same time improving the quality of such services via analytics. In this example, there is an Equipment Supplier 700 and multiple Equipment Manufacturers 705(1)-705(3). The Equipment Supplier 700 provides services to a plurality of companies in the oil vertical space, e.g., Oil Company 1, Oil Company 2, Oil Company 3 and Oil Company 4 shown at reference numerals 710(1)-710(4). The Equipment Supplier 700 supplies sensors, personnel authentication, and surveillance to Oil Companies 710(1)-710(4).

Suppose that IoT sensors (and software agents) in a petrochemical plant collect information, as shown in FIG. 12. This information can be used to form communities organized per sensor type and client. A federation 720 among these multiple communities is defined because multiple autonomous players participate (e.g., an oil company, a sensor company, an analytics company, a supplier, etc.). Federation rules can be seen as an enabler for cloud-based solutions.

As shown in FIG. 12, Equipment Supplier 700 and Equipment Manufacturer 705(1) supply each of the oil companies with sensors for a variety of processes. Communities of multiple sensors from multiple vendors can be built at a single customer level, e.g., sensors from multiple vendors affecting a single process at Oil Company 3. At the same time, a community can be built of a single-type of sensor performing the same task at different locations regardless of the oil company.

Use Case: Providing Optimized Sensor/Analytic Services in the Manufacturing IoE

Reference is now made to FIG. 13 for a use case example in the Discrete Manufacturing. Industrial Automation Equipment Provider 800 offers cloud services to assist Customers 1-4 in managing their process security and energy-consumption in the Industrial Automation and Control Systems. In that case, for each of the customers, Industrial Automation Equipment Provider 800 builds a federation 810 of devices, machines, programmable logic controllers (PLCs), and networks for the purpose of managing a particular process or machine. At the same time, Industrial Automation Equipment Provider 800 builds another device-specific federation 820 that crosses boundaries of customer enterprise networks. Since Industrial Automation Equipment Provider 800 has access to all these environments individually, it will have the capability of building a "higher-layer" federation that brings together all devices of Industrial Automation Equipment Provider 800 regardless of where they are and at which customer premises they reside. Industrial Automation Equipment Provider 800 can use the data collected from its devices to build better usage/utilization and fatigue measurements or to run various predictive maintenance type analytics.

Use Case: Minimizing Car Insurance Company Risk

Cars (or in general, motor vehicles) with speed sensors are one community of things. Courthouses with information on driver traffic violations are another community. Insurance companies are a third community. A federation of communities can be useful because multiple, autonomous players participate. The insurance companies can have up-to-date statistics about their insured drivers' records, so they can adjust their risk, premiums, etc. Universal Description, Discovery and Integration (UDDI) protocols may be used for service discovery.

To summarize, methods are presented herein to dynamically and automatically create a "community of IoT things". Further, techniques are provided for the discovery, creation, and subsequent management of the overall community. Overall, the system includes all the pieces to create these "communities of interest" (even self-creation), and includes the policy distribution, data model, discovery, and actual creation. This automates the creation of relationships in an IoT and IoE environment, as well as the maintenance/management of those relationships.

In addition, techniques are presented herein to enable communication among communities of IoT devices (in other words, conversations among IoT devices). A methodology and protocols are provided to enable such conversations in an automated way. Services can then be built, organized, discovered, authenticated, billed and managed efficiently inside the IoT ecosystem. In this sense, the techniques presented herein provide support for a "super-protocol" that discovers things, people and services.

In summary, a method is provided comprising: identifying one or more of a plurality of network-connected devices based on one or more policies that define one or more communities of network-connected devices, wherein a community of network-connected devices includes network-connected devices that share common functional, physical or relational attributes; and storing information indicating the one or more communities of which each of the one or more of the plurality of network-connected devices is a member based on the policies that define the one or more communities and functional, physical or relational attributes of the one or more of the plurality of network-connected devices.

Similarly, an apparatus is provided comprising: at least one network interface to enable connectivity to a plurality of network-connected devices; a memory; a processor coupled to the network interface and to the memory, to: identify one or more of the plurality of network-connected devices based on one or more policies that define one or more communities of network-connected devices, wherein a community of network-connected devices includes network-connected devices that share common functional, physical or relational attributes; and store information indicating the one or more communities of which each of the one or more of the plurality of network-connected devices is a member based on the policies that define the one or more communities and functional, physical or relational attributes of the one or more of the plurality of network-connected devices.

Further still, a system is provided comprising: a plurality of network devices in communication with a plurality of network-connected devices, each of the network devices: identifies one or more of the plurality of network-connected devices based on one or more polices that define one or more communities of network-connected devices, wherein a community of network-connected devices includes network-connected devices that share common functional, physical or relational attributes; and stores information indicating the one or more communities of which each of the one or more of the plurality of network-connected devices in communication therewith is a member based on the policies that define the one or more communities and functional, physical or relational attributes of the one or more of the plurality of network-connected devices; and a server in communication with the plurality of network devices, wherein the server supplies the one or more policies that define the one or more communities of network-connected devices.

The above description is intended by way of example only. Various modifications and structural changes may be made therein without departing from the scope of the concepts described herein and within the scope and range of equivalents of the claims.

What is claimed is:

1. A method for dynamically creating a community of a plurality of network-connected devices, comprising:
   at a server:
      receiving, from a plurality of network devices, information representing identities and attributes of a plurality of network-connected devices that are connected to the plurality of network devices, wherein the information is collected by the plurality of network devices by monitoring data traffic associated with the plurality of network-connected devices;
      storing the information representing identities and attributes of the plurality of network-connected devices that are connected to the plurality of network devices;
      analyzing the information representing identities and attributes of the plurality of network-connected devices to generate, by the server, one or more policies based on functional, physical or relational attributes of the plurality of network-connected devices for dynamically creating one or more communities of network-connected devices, the analyzing comprises using artificial intelligence to structure the information representing identities and attributes of the plurality of network-connected devices;
      grouping results of structuring the information into categories for use in assigning network connected devices to communities;
      storing the one or more policies, wherein the one or more policies define one or more attributes associated with the one or more communities;
      sending from the server to the plurality of network devices data representing the one or more policies, the one or more policies instructing the plurality of network devices to identify one or more of the plurality of network-connected devices as members of a community;

receiving, from the plurality of network devices, information identifying one or more of the plurality of network-connected devices based on the one or more policies that define the one or more attributes associated with the one or more communities of network-connected devices;

storing information indicating the one or more communities of which each of the one or more of the plurality of network-connected devices is a member based on the policies; and establishing a publish-subscribe bus connecting the plurality of network devices for the members of the communities of network-connected devices, wherein via the publish-subscribe bus the members publish messages without knowledge of a subscriber and express interests in one or more classes of messages without knowledge of a publisher.

2. The method of claim 1, further comprising generating a join message on behalf of each of the one or more of the plurality of network-connected devices, the join message identifying a particular network-connected device and the community to which the network-connected device joins.

3. The method of claim 2, further comprising sending the join message to the server.

4. The method of claim 1, further comprising:
discovering existence of two or more different communities of network-connected devices;
forming a federation of the two or more different communities of network-connected devices; and
establishing communication rules for communication between the two or more different communities of network-connected devices.

5. The method of claim 4, further comprising:
receiving from a server or one of the plurality of network devices, information describing one or more policies for forming the federation between the two or more different communities of network-connected devices.

6. The method of claim 5, further comprising:
advertising to other network devices, the information describing one or more policies for forming the federation between the two or more different communities of network-connected devices.

7. The method of claim 4, wherein establishing communication rules comprises defining grammar, message syntax, and security parameters for enabling communication on behalf of network-connected devices that are members of different communities.

8. The method of claim 7, further comprising establishing management rules, including when to dissolve a federation of two or more communities of network-connected devices.

9. The method of claim 1, further comprising:
registering a plurality of network-connected sensor and actuator devices having diverse functional capabilities and which communicate with different communication protocols.

10. The method of claim 9, further comprising:
distributing to the plurality of network-connected sensor and actuator devices information for a policy that describes analysis to be performed on specified types of data obtained by the plurality of network-connected sensor and actuator devices.

11. The method of claim 1, further comprising:
generating, by the server, a modeled network policy based on functional attributes of the plurality of the network-connected devices obtained from the information collected by monitoring data traffic associated with the plurality of network-connected devices,
wherein grouping comprises grouping the plurality of network-connected devices into the categories based on a service delivered by respective ones of the plurality of network-connected devices, and
wherein each of the one or more policies comprises policy elements including instructions to form a community from among the one or more communities based on at least one alarm trigger.

12. A server comprising:
at least one network interface to enable connectivity to a plurality of network-connected devices;
a memory; and
a processor coupled to the network interface and to the memory, the processor being configured to:
receive, from a plurality of network devices, information representing identities and attributes of a plurality of network-connected devices that are connected to the plurality of network devices, wherein the information is collected by the plurality of network devices by monitoring data traffic associated with the plurality of network-connected devices;
store the information representing identities and attributes of the plurality of network-connected devices that are connected to the plurality of network devices;
analyze the information representing identities and attributes of the plurality of network-connected devices to generate one or more policies based on functional, physical or relational attributes of the plurality of network-connected devices for dynamically creating one or more communities of network-connected devices, the information is analyzed using artificial intelligence to structure the information representing identities and attributes of the plurality of network-connected devices;
group results of structuring the information into categories for use in assigning network-connected devices to communities;
store one or more policies, wherein the one or more policies define one or more attributes associated with the one or more communities;
send from the server to the plurality of network devices data representing the one or more policies, the one or more policies instructing the plurality of network devices to identify one or more of the plurality of network-connected devices as members of a community;
receive, from the plurality of network devices, information identifying one or more of the plurality of network-connected devices based on the one or more policies that define the one or more attributes associated with the one or more communities of network-connected devices;
store information indicating the one or more communities of which each of the one or more of the plurality of network-connected devices is a member based on the policies; and
establish a publish-subscribe bus connecting the plurality of network devices for the members of the communities of network-connected devices, wherein via the publish-subscribe bus the members publish messages without knowledge of a subscriber and express interests in one or more classes of messages without knowledge of a publisher.

13. The server of claim 12, wherein the processor further: registers a plurality of network-connected sensor and actuator devices having diverse functional capabilities and which communicate with different communication protocols.

14. The server of claim 13, wherein the processor further: causes distribution to the plurality of network-connected sensor and actuator devices information for a policy that describes analysis to be performed on specified types of data obtained by the plurality of network-connected sensor and actuator devices.

15. The server of claim 12, wherein the processor is further configured to:
discover existence of two or more different communities of network-connected devices;
form a federation of the two or more different communities of network-connected devices; and
establish communication rules for communication between the two or more different communities of network-connected devices.

16. A system comprising:
a plurality of network devices in communication with a plurality of network-connected devices;
a server in communication with the plurality of network devices;
wherein each of the network devices:
sends, to a server, information representing identities and attributes of a plurality of network-connected devices that are connected to the plurality of network devices, wherein the information is collected by the plurality of network devices by monitoring data traffic associated with the plurality of network-connected devices;
receives, from the server, one or more policies that define one or more attributes associated with one or more communities of network-connected devices, wherein the one or more communities of network-connected devices include network-connected devices that share common functional, physical or relational attributes, wherein the one or more policies are dynamically sent by the server in response to receiving the information representing identities and attributes of the plurality of network-connected devices;
identifies one or more of the plurality of network-connected devices based on the one or more polices that define the one or more attributes associated with the one or more communities of network-connected devices;
stores information indicating the one or more communities of which each of the one or more of the plurality of network-connected devices in communication therewith is a member based on the policies that define the one or more attributes associated with the one or more communities and the functional, physical or relational attributes of the one or more of the plurality of network-connected devices; and
establishes a publish-subscribe bus connecting the plurality of network devices for the members of the communities of network-connected devices, wherein via the publish-subscribe bus the members publish messages without knowledge of a subscriber and express interests in one or more classes of messages without knowledge of a publisher; and
wherein the server generates and sends the one or more policies that define the one or more attributes associated with the one or more communities of network-connected devices, the one or more policies instructing the plurality of network devices to identify one or more of the plurality of network-connected devices as members of a community,
wherein the server:
stores information representing identities and attributes of the plurality of network-connected devices; and
analyzes the information representing identities and attributes of the plurality of network-connected devices to generate the one or more policies based on the functional, physical or relational attributes of the plurality of network-connected devices for dynamically creating the one or more communities, and
uses artificial intelligence to structure the information representing identities and attributes of the plurality of network-connected devices; and
groups results structuring the information into categories for use in assigning network-connected devices to communities.

17. The system of claim 16, wherein one or more of the plurality of network devices generates a join message on behalf of each of the one or more of the plurality of network-connected devices, the join message identifying a particular network-connected device and the community to which the network-connected device joins, and sends the join message to the server.

18. The system of claim 16, wherein the server further:
discovers existence of two or more different communities of network-connected devices;
forms a federation of the two or more different communities of network-connected devices; and
establishes communication rules for communication between the two or more different communities of network-connected devices.

* * * * *